July 20, 1965
J. D. ORR
3,195,361
FLUSH VALVE SEALING MEANS
Filed March 2, 1964
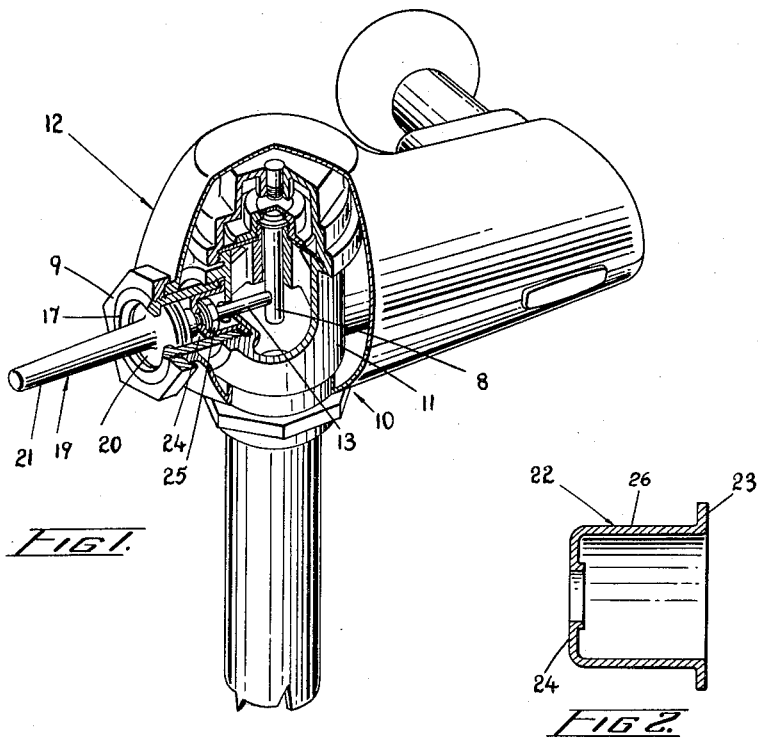
FIG 1.
FIG 2.
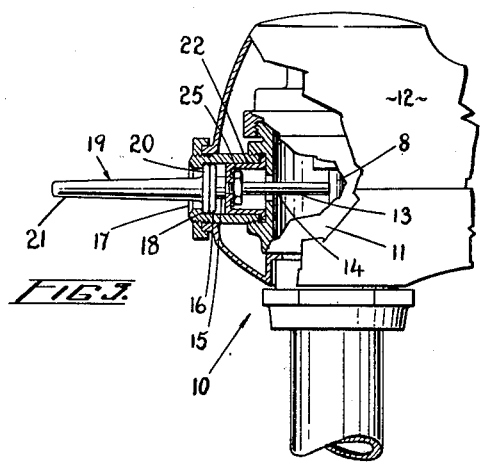
FIG 3.
INVENTOR
JAMES D. ORR
BY
ATTORNEY

United States Patent Office 3,195,361
Patented July 20, 1965

3,195,361
FLUSH VALVE SEALING MEANS
James D. Orr, Toronto, Ontario, Canada, assignor to Josam Products Limited, Toronto, Ontario, Canada, a corporation of Canada
Filed Mar. 2, 1964, Ser. No. 348,464
2 Claims. (Cl. 74—18.2)

This invention relates generally to flush valves and more specifically to sealing arrangements therefore to prevent egress of water past the valve actuating member and handle therein.

There are in use at present various sealing systems. One of the more common types utilizes a coil spring to bias a collar mounted on the inner end of the handle against the housing within which it is mounted. This type further requires a casting to provide an elongated bearing surface for the valve actuating member. After slight usage, this system has a pronounced tendency to leak and the replacement of parts is relatively expensive. Another known type of sealing system involves the use of resilient cup-shaped members which rely entirely upon the retention of their resiliency characteristics and shape in order to effect a satisfactory sealing function; that is, they do not provide any positive mechanical connection. As with the previous type mentioned, this system is not wholly satisfactory.

With this invention, the applicant has overcome the prior art difficulties as to cost and efficiency with the provision of a simple, inexpensive and easily replaceable sealing grommet adapted upon installation in a flush valve to provide a mechanical gasket-type seal at both ends thereof.

The invention will be more readily understood with reference to the drawings in which:

FIGURE 1 shows a cut-away view of the valve assembly in perspective;

FIGURE 2 shows a sectional view of the sealing grommet;

FIGURE 3 shows a cut-away section view of the sealnig device.

Turning to FIGURE 1 of the drawings a flush valve 10 of a type well known in the art has a valve body generally indicated at 11 enclosed within a casing 12. The valve is operated as is well known by the action of valve stem actuator 13 on the valve stem 8.

As seen with reference to FIGURE 3 the valve stem actuator 13 comprises an arm 14 stepped outwardly at one end to form a plunger 15 and a head portion 16. It will be noted that a section of the arm immediately adjacent the plunger 15 is threaded, the reason for this will be apparent as the description proceeds.

The housing within which the valve actuating member reciprocates consists of a tubular element 17 threaded at both ends for connection to the valve body and for the nut 9 which fastens the casing thereto. At the outer or handle end of the element 17 handle retaining means is provided in the form of an internal shoulder 18. Handle 19, having a head 20 and a shank 21, is retained in the element through the abutment of the head 20 against shoulder 18.

In FIGURES 2 and 3 the sealing grommet 22 is illustrated as being formed of any suitable water impervious resilient and flexible material and having a generally tubular shape. At one end of the grommet there is provided an outwardly directed, peripheral flange 23 while the other end is provided with an inwardly directed peripheral flange 24. As shown in FIGURE 2, the flange 24 defines a bore axially aligned with the remainder of the grommet while the edges of the flange defining the bore are turned inwardly to rigidify the structure somewhat and also to provide greater surface contact between the grommet and the actuating arm 13 which the grommet receives in sealing relationship through said bore and as best seen in FIGURES 1 and 3.

It will be seen by reference to the drawings and in particular FIGURE 2, that the grommet 22 has substantially thin walls with the peripheral side wall in contact with and supported by the inner wall of the tubular element 17. The junction between the flange 24 and the peripheral side wall indicated by the numeral 26 is formed with a radius which encourages or induces the proper inward roll of the grommet under the thrust action of the plunger 15. It will also be seen that the plunger 15 is substantially smaller in diameter than the diameter of the grommet so that under the thrust action caused by operating the handle 22, the plunger is pushed into the grommet and at the same time rolls the peripheral wall 26 inward. The head portion 16 is of disc like form and slidably fits into the tubular element 17 and as seen in FIGURE 3 is spaced from the flange 24 by the plunger 15. The disc, as will be seen in the drawings, can only move a distance equal to the length of the plunger 15.

As will be seen, upon assembly of the elements described above, the grommet is positioned within the tubular element 17 with the arm 14 passed through the axially aligned bore in the flange 24 until the latter abuts the plunger 15. Nut 25, with a suitable washer, is then threaded on the previously mentioned threaded section of the arm 14 to securely clamp the flange 24 in position.

The element 17 is then secured into the valve body 11, as best seen in FIGURE 3, engaging and compressing flange 23 between itself and the valve body.

Thus, applicant's invention provides a sealing device having positive mechanical seals at both ends.

In operation the general principle is the same as that known in the art, that is, on manipulation of the handle, the valve stem actuator 13 is pushed inwardly against the resistance of the grommet 22 thus tilting the valve stem and opening the valve. Upon releasing the handle, the resiliency of the grommet biases the actuating member away from the valve stem allowing the valve to close while the egress of fluid, past the actuating member, is completely precluded by the positive mechanical seals at both ends of the grommet.

While a single embodiment has been described herein it is to be understood that many modifications are possible while remaining within the spirit and scope of the invention and applicant wishes to be limited only by the claims appended hereto.

What I claim as new and desire to protect by Letters Patent of the United States is:

1. In a hydraulic flush valve having a valve body, a valve operating stem, a stem actuator, a hollow housing for said actuator and a handle for actuating said stem actuator, the combination comprising
 (a) a head on said stem actuator engageable by a disc like member carried on the handle, said head and member being slidably supported by the inner wall of the housing,
 (b) said actuator having a substantially long shank extending from said head to the valve operating stem,
 (c) said shank having adjacent to the head thereof a plunger of substantially smaller diameter than the inside diameter of the housing and a reduced portion adjacent the plunger and
 (d) a flexible resilient hollow member having an apertured end wall and a peripheral sidewall terminating in an outwardly formed flange defining an open end, said peripheral sidewall being supported by the inner peripheral wall of the actuator housing with the apertured end wall abutting against and secured to the plunger with the shank extending centrally through the flexible member and with the flange secured in fluid tight engagement between the housing and the body.

2. In a hydraulic flush valve having a valve body, a valve operating stem, a stem actuator, a hollow cylindrical housing for said actuator and a handle for actuating said stem actuator, the combination comprising
 (a) a disc like head on said stem actuator engageable by a disc like member carried on the handle, said head and member being slidably supported by the inner wall of the housing,
 (b) said actuator having a substantially long shank extending from said head to the valve operating stem,
 (c) said shank having adjacent to the head thereof, a cylindrical plunger of substantially smaller diameter than the inside diameter of the housing and a reduced portion adjacent the plunger and
 (d) a flexible resilient member of tubular form having an apertured end wall and a peripheral side wall terminating in an outwardly formed flange defining an open end, said peripheral sidewall being supported by the inner peripheral wall of the actuator housing with the apertured end wall abutting against and secured to the plunger with the shank extending centrally through the flexible member and with the flange secured in fluid tight engagement between the housing and the body.

References Cited by the Examiner
UNITED STATES PATENTS

| | | | |
|---|---|---|---|
| 1,884,374 | 10/32 | Tatter | 74—18.2 |
| 1,976,966 | 10/34 | Royle | 74—18.1 X |
| 2,506,140 | 5/50 | Delaney | 74—18.2 |

BROUGHTON G. DURHAM, *Primary Examiner.*

MILTON KAUFMAN, *Examiner.*